United States Patent [19]
Lunsford et al.

[11] 3,891,646
[45] June 24, 1975

[54] 5-(2-AMINOETHYL)-2,3-DIOXOPIPERA-ZINES

[75] Inventors: Carl Dalton Lunsford, Richmond; Albert Duncan Cale, Jr., Mechanicsville, both of Va.

[73] Assignee: A. H. Robins Company, Incorporated, Richmond, Va.

[22] Filed: Feb. 29, 1972

[21] Appl. No.: 230,460

Related U.S. Application Data

[63] Continuation-in-part of Ser. No. 32,346, April 24, 1970, abandoned.

[52] U.S. Cl..... 260/268 DK; 260/247.2 A; 424/250
[51] Int. Cl............................................. C07d 51/72
[58] Field of Search ............................ 260/268 DK

*Primary Examiner*—Donald G. Daus
*Assistant Examiner*—Jose Tovar

[57] ABSTRACT

1-Hydrocarbon-5-(2-aminoethyl)-4-aryl-2,3-dioxopiperazines active as antiviral agents are disclosed.

5 Claims, No Drawings

5-(2-AMINOETHYL)-2,3-DIOXOPIPERAZINES

The present application is a continuation-in-part of copending application Ser. No. 32,346, filed Apr. 27, 1970 now abandoned.

The present invention relates to heterocyclic organic compounds which may be referred to broadly as substituted piperazines and is more particularly concerned with 1-hydrocarbon-5-(2-aminoethyl)-4-phenyl-2,3-dioxopiperazines, compositions thereof and methods of CO- making and using the same.

The invention is especially concerned with novel compounds having the formula:

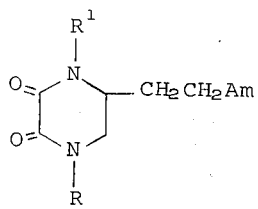

Formula I wherein;

R is selected from the group consisting of lower-alkyl, lower-cycloalkyl and phenyllower-alkyl;

$R^1$ is selected from the group consisting of phenyl, lower-alkylphenyl, lower-alkoxyphenyl, halophenyl, and trifluoromethylphenyl, Am is amino, and pharmaceutically acceptable acid addition salts thereof.

The novel compounds of the present invention have utility as antiviral agents and are prepared as will be disclosed more fully hereinafter from 1-hydrocarbon-4-phenyl-2,3-dioxo-5-(2-haloethyl)piperazines disclosed in copending application Ser. No. 32,364 now U.S. Pat. No. 3,696,104, issued 10-3-1972.

The novel compounds of the present invention display significant antiviral activity and may be employed in the prophylaxis as well as in the therapy of viral infections of the myxovirus group including, but not limiting thereto, Parainfluenza, Types I and III, Long Strain of Respiratory Syncytial Virus and Type A Influenza infections. The antiviral activity of the novel compounds has been demonstrated by standard in vitro and in vivo techniques including tissue culture and mouse protection tests.

The antiviral activity of some of the novel compounds of the present invention is shown below in Table I.

TABLE I

| Compound | Influenza | Type III[1] | RS[2] |
|---|---|---|---|
| Example 1 | Active | — | — |
| Example 2 | — | Active | — |
| Example 7 | — | Active | — |
| Example 8 | Active | Active | Active |

[1] Parainfluenza, Type III.
[2] Long Strain of Respiratory Syncytial Virus.

It is, accordingly, an object of the present invention to provide new and useful 1-hydrocarbon-5-(2-aminoethyl)-4-phenyl-2,3-dioxo-piperazines. A further object is to provide 1-hydrocarbon-5-(2-aminoethyl)-4-phenyl-2,3-dioxopiperazines useful as antiviral agents. A still further object is to provide methods for preparing the new and useful compounds described herein. Other objects of the invention will be apparent to one skilled in the art, and still other objects will become apparent hereinafter.

The term "lower-alkyl" as used herein includes straight and branched chain radicals of up to eight carbon atoms inclusive and is exemplified by such groups as methyl, ethyl, propyl, isopropyl, butyl, secondary butyl, tertiary butyl, amyl, isoamyl, hexyl, heptyl, octyl, and the like. "Lower-alkoxy" has a formula -O-lower-alkyl.

The term "phenyl" as used in the specification and claims hereof refers to the unsubstituted phenyl radical or to a phenyl radical substituted by any radical or radicals which are not reactive or otherwise interfering under the conditions of reactions such as lower-alkoxy, lower-alkyl, trifluormethyl, halo, and the like. The substituted phenyl radicals have preferably no more than one to three substituents such as those given above and, furthermore, these substituents can be in various available positions of the phenyl nucleus and, when more than one substituent is present, can be the same or different and can be in various position combinations relative to each other. Lower-alkyl and lower-alkoxy substituents each have preferably one to four carbon atoms which can be arranged as straight or branched chains.

The term "cycloalkyl" as used herein includes primarily cyclic alkyl radicals containing three to nine carbon atoms inclusive and encompasses such groups as cyclopropyl, cyclobutyl, cyclohexyl, cyclopentyl, methylcyclohexyl, and cyclooctyl.

When halogen is referred to herein, preferably but not necessarily, a halogen of atomic weight in excess of 18 but not greater than 80, is employed.

Among the suitable amino radicals included within the symbol -Am are primary, secondary and tertiary amino radicals, such as unsubstituted amino ($-NH_2$), lower-alkylamino, di-lower-alkylamino, basic saturated monocyclic heterocyclic radicals having up to a maximum of 12 carbon atoms as exemplified by piperidino, pyrrolidino, morpholino, piperazino, lower-alkylpiperazino (e.g., C- or $N^4$-methylpiperazino), and 4-hydroxy-4-phenylpiperidino.

The pharmaceutically acceptable non-toxic salts include the organic and inorganic acid addition salts, for example, those prepared from acids such as hydrochloric, sulfuric, sulfamic, tartaric, fumaric, hydrobromic, hydroiodic, glycolic, citric, maleic, phosphoric, succinic, and the like. Such salts are prepared by conventional methods.

The preparation of the 1-hydrocarbon-5-(2-aminoethyl)-4-phenyl-2,3-dioxopiperazines (I) may be accomplished by mixing and reacting the appropriately substituted 5-(2-haloethyl)-2,3-dioxopiperazine (II) with an amine (III). The reaction sequence is illustrated by the following:

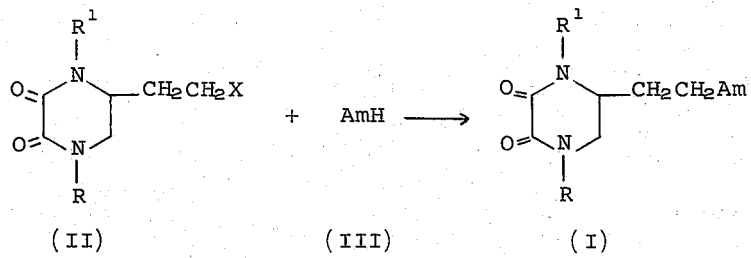

A suitable procedure for carrying out the process of the invention is as follows:

The conversion of the halo-compound (II) to a 1-hydrocarbon-5-(2-aminoethyl)-4-aryl-2,3-dioxopiperazine (I) may be carried out by allowing the halo-compound (II) to react with an amine (III) as shown above. Any suitable reaction procedure may be used. An excess of the amine is frequently employed.

In the case of relatively non-volatile amines such as morpholine, the halo derivative is refluxed, usually with at least two molar equivalents of the amine, until the reaction is substantially complete. The reaction time required may vary depending upon the particular amine used, but 2 hours is generally sufficient for complete reaction. A solvent, e.g., ethanol, isopropanol, dioxane, ethylene glycol, or the like, may be used, in which case longer reaction times of up to 8 hours are necessary. The excess amine and solvent are removed by stripping using a suitable heat source. The residue is isolated and purified in any appropriate conventional manner.

The reaction of the halo-compound (II) with an excess of a volatile amine, such as dimethylamine, may be conducted in a stainless steel pressure vessel employing a suitable reaction solvent, e.g., ethanol, isopropanol, dioxane, or the like. The reactants together with the solvent are sealed in the pressure vessel and heated to a suitable temperature as, for example, about 75°–200°C. The reaction may occur at room temperature, but elevated temperatures are usually advantageously employed to shorten the reaction period. The length of the reaction time varies with the type of amine and the temperature range employed, 2 hours of heating at temperatures within the range of 100°–150°C. usually being sufficient to complete the reaction. A longer heating period may frequently be used without any resultant harm to the product. The pressure vessel is cooled and any excess amine and solvent are removed, as under reduced pressure using a suitable heat source as, for example, steam. The residue may then be isolated and purified as above.

The examples immediately following illustrate the preparation of 1-hydrocarbon-5-(2-aminoethyl)-4-aryl-2,3-dioxopiperazines according to the invention.

EXAMPLE 1

2,3-Dioxo-1-isopropyl-5-(2-morpholinoethyl)-4-phenylpiperazine.

To 100 ml. of morpholine was added 10 g. (0.04 mole) of 5-(2-chlorophenyl)-2,3-dioxo-1-isopropyl-4-phenylpiperazine and the solution was refluxed for 4 hours. The solution was concentrated in vacuo and the residue partitioned between chloroform and dilute sodium hydroxide solution. The chloroform layer was dried with sodium sulfate and concentrated in vacuo. The residue was crystallized twice from isopropyl ether-methanol; the product weighed 8.5 g. (61%) and melted at 190°–195°C.

| Analysis: | Calculated for $C_{19}H_{27}N_3O_3$: | C, 66.06; H, 7.88; N, 12.16 |
|---|---|---|
| | Found: | C, 66.06; H, 7.85; N, 12.14 |

Using the process described in Example 1, the following compounds are prepared from the stated starting materials:

2,3-dioxo-1-isopropyl-4-phenyl-5-(2-pyrrolidinoethyl) piperazine is prepared by reacting 5-(2-chloroethyl)-2,3-dioxo-1-isopropyl-4-phenylpiperazine and pyrrolidine;

2,3-dioxo-1-isopropyl-4-(o-chlorophenyl)-5-(2-piperidinoethyl) piperazine is prepared by reacting 5-(2-chloroethyl)-2,3-dioxo-1-isopropyl-4-(o-chlorophenyl)piperazine and piperidine;

2,3-dioxo-1-ethyl-5-[2-(4-hydroxy-4-phenylpiperidino)ethyl]-4-phenylpiperazine is prepared by reacting 5-(2-chloroethyl)-2,3-dioxo-1-ethyl-4-phenylpiperazine and 4-hydroxy-4-phenylpiperidine;

2,3-dioxo-1-ethyl-5-[2-(4-methylpiperazino)ethyl]-4-(m-trifluoromethylphenyl)piperazine is prepared by reacting 5-(2-chloroethyl)-2,3-dioxo-1-ethyl-4-(m-trifluoromethylphenyl) piperazine and 4-methylpiperazine; and 1-benzyl-2,3-dioxo-5-(2-piperidinoethyl)-4-phenylpiperazine is prepared by reacting 1-benzyl-5-(2-chloroethyl)-2,3-dioxo-4-phenylpiperazine and piperidine.

EXAMPLE 2

2,3-Dioxo-5-(2-dimethylaminoethyl)-1-isopropyl-4-phenylpiperazine.

To a solution of 4 g. (0.088 mole) of dimethylamine in 250 ml. of absolute ethanol was added 13 g. (0.044 mole) of 5-(2-chloroethyl)-2,3-dioxo-1-isopropyl-4- phenylpiperazine. The mixture was heated in a steel bomb at 140°C. for 18 hours. The solution was concentrated in vacuo and the residue partitioned between chloroform and dilute sodium hydroxide solution. The chloroform layer was concentrated and the residue dissolved in 75 percent methyl isobutyl ketone —25 percent methanol and the solution was treated with ethereal hydrogen chloride. The hydrochloride salt melted above 270°C. The hydrochloride salt was partitioned between chloroform and dilute sodium hydroxide solution, the chloroform layer was separated and concentrated in vacuo; the residue was crystallized from ethyl acetate-methanol. The free base weighed 6 g. (45%) and melted at 173°–175°C.

| Analysis: | Calculated for $C_{17}H_{25}N_3O_2$: | C, 67.30; H, 8.31; N, 13.89 |
| --- | --- | --- |
| | Found: | C, 67.34; H, 8.22; N, 13.89 |

Using the process described in Example 2, the following compounds are prepared from the stated starting materials:

2,3-dioxo-1-isopropyl-5-(2-methylaminoethyl)-4-(o-methoxyphenyl)piperazine is prepared by reacting 5-(2-chloroethyl)- 2,3-dioxo-1-isopropyl-4-(o-methoxyphenyl)piperazine and methylamine;

2,3-dioxo-1-isopropyl-5-(2-isopropylaminoethyl)-4-phenylpiperazine is prepared by reacting 5-(2-chloroethyl)-2,3-dioxo-1-isopropyl-4-phenylpiperazine and isopropylamine; and 2,3-dioxo-5-(2-dimethylaminoethyl)-1-isopropyl-4-(o-methylphenyl)piperazine is prepared by reacting 5-(2-chloroethyl)- 2,3-dioxo-1-isopropyl-4-(o-methylphenyl)piperazine and dimethylamine.

EXAMPLE 3

2,3-Dioxo-1-methyl-5-(2-morpholinoethyl)-4-phenylpiperazine.

Twenty grams (0.075 mole) of 5-(2-chloroethyl)-2,3-dioxo-1-methyl-4-phenylpiperazine was added to 100 ml. of morpholine and the solution refluxed 4 hours. The solution was concentrated in vacuo and the residue partitioned between chloroform and dilute sodium hydroxide solution. The chloroform layer was dried with sodium sulfate, concentrated and the residue crystallized from ethyl acetate. The product weighed 16.5 g. (70%) and melted at 124°–126°C. after recrystallization from ethyl acetate.

| Analysis: | Calculated for $C_{17}H_{23}N_3O_3$: | C, 64.33; H, 7.30 |
| --- | --- | --- |
| | Found: | C, 64.07; H, 7.33 |

EXAMPLE 4

2,3-Dioxo-1-ethyl-5-(2-morpholinoethyl)-4-phenylpiperazine.

A solution of 20.0 g. (0.0715 mole) of 5-(2-chloroethyl)-2,3-dioxo-1-ethyl-4-phenylpiperazine and 150 ml. of morpholine was refluxed 4 hours. The reaction was concentrated at reduced pressure and the residual material was partitioned between chloroform and dilute sodium hydroxide solution. The chloroform solution was dried over sodium sulfate and concentrated. The residue was crystallized from ethyl acetate. The product weighed 16 g. (67%) and melted at 124°–126°C.

| Analysis: | Calculated for $C_{18}H_{25}N_3O_3$: | C, 65.23; H, 7.61; N, 12.68 |
| --- | --- | --- |
| | Found: | C, 65.12; H, 7.52; N, 12.50 |

EXAMPLE 5

5-(2-Dimethylaminoethyl)-2,3-dioxo-1-methyl-4-phenylpiperazine.

Twenty-three grams (0.086 mole) of 5-(2-chloroethyl)-2,3-dioxo-1-methyl-4-phenylpiperazine and 7.75 g. (0.172 mole) of dimethylamine were combined in 200 ml. of ethanol and the mixture heated in a steel bomb for 18 hours at steam bath temperature. The cooled reaction mixture was concentrated in vacuo and the residue partitioned between chloroform and dilute sodium hydroxide solution. The chloroform layer was concentrated and the residue recrystallized three times from ethyl acetateisopropyl ether mixture. The product weighed 3 g. and melted at 122°–124°C.

| Analysis: | Calculated for $C_{15}H_{21}N_3O_2$: | C, 65.42; H, 7.68; N, 15.26 |
| --- | --- | --- |
| | Found: | C, 65.10; H, 7.85; N, 15.08 |

EXAMPLE 6

5-(2-Dimethylaminoethyl)-2,3-dioxo-1-ethyl-4-phenylpiperazine.

A solution of 27 grams (0.096 mole) of 5-(2-chloroethyl)-2,3-dioxo-1-ethyl-4-phenylpiperazine and 8.6 g. (0.192 mole) of dimethylamine in 500 ml. of ethanol was heated in a steel bomb on the steam bath for 18 hours. The reaction mixture was concentrated in vacuo and the residue partitioned between dilute sodium hydroxide solution and chloroform while being kept ice cold. The chloroform layer was concentrated and the residue crystallized three times from ethyl acetate; m.p. 104°–123°C. The solid was partitioned between ethyl acetate and dilute hydrochloric acid. The aqueous acid solution was made basic with sodium hydroxide solution, the base-insoluble oil extracted with chloroform, the chloroform extracts concentrated and the residue crystallized from ethyl acetate-isopropyl ether mixture. The product weighed 2.0 g. and melted at 123°–125°C.

Analysis: Calculated for $C_{16}H_{23}N_3O_2$: C, 66.41; H, 8.01; N, 14.52
Found: C, 66.14; H, 7.98; N, 14.66

EXAMPLE 7

1-Cyclohexyl-2,3-dioxo-5-(2-morpholinoethyl)-4-phenylpiperazine.

A mixture of 20 g. (0.06 mole) of 5-(2-chloroethyl)-2,3-dioxo-1-cyclohexyl-4-phenylpiperazine and 100 ml. of morpholine was refluxed 4 hours. The reaction mixture was concentrated under reduced pressure and the residual material was partitioned between chloroform and dilute sodium hydroxide solution. The chloroform solution was dried over sodium sulfate and concentrated. The solid residue was crystallized from ethyl acetate-dimethylformamide to give 16 g. (69%) of product which melted at 187°–188°C.

Analysis: Calculated for $C_{22}H_{31}N_3O_3$: C, 68.54; H, 8.10; N, 10.90
Found: C, 68.67; H, 8.24; N, 11.03

EXAMPLE 8

1-Cyclohexyl-2,3-dioxo-5-(2-dimethylaminoethyl)-4-phenylpiperazine Hydrochloride.

A solution of 20 grams (0.06 mole) of 5-(2-chloroethyl)-2,3-dioxo-1-cyclohexyl-4-phenylpiperazine and 5.5 g. (0.12 mole) of dimethylamine in 200 ml. of ethanol was heated at 130°–140°C. for 24 hours. The mixture was concentrated in vacuo and the residue partitioned between chloroform and dilute sodium hydroxide solution. The chloroform layer was dried with sodium sulfate, concentrated and the residue crystallized from water-methanol. The product weighed 5 g. and melted at 188°–192°C. The base was mixed with 150 ml. of ethanol, the mixture heated to the reflux point and hydrogen chloride passed into the hot solution until the solution remained acidic. Methyl isobutyl ketone (50 ml.) was added to the hot solution which was allowed to cool slowly. The hydrochloride salt which was obtained weighed 6.5 g. (28%) and melted at 315°C.

Analysis: Calculated for $C_{20}H_{30}N_3ClO_2$: C, 63.22; H, 7.96; N, 11.06
Found: C, 63.33; H, 7.95; N, 10.96

Formulation and Administration

Effective quantities of any of the foregoing pharmacologically active compounds may be administered to a living animal body in any one of various ways, for example, orally as in capsules or tablets, and parenterally in the form of sterile solutions. The free basic amino compounds, while effective, are preferably formulated and administered in the form of their non-toxic acid addition salts.

The formulations of Example 9 are representative for the pharmacologically active compounds of the invention, but have been especially designed to embody as active ingredient the free basic compounds of Examples 1, 2, 7 or 8 or their hydrochlorides.

EXAMPLE 9

Formulations

1. Capsules - Capsules of 250 mg. of active ingredient are prepared.

| Typical blend for encapsulation | Mg. per capsule |
|---|---|
| Active ingredient, as salt | 250.0 |
| Lactose | 100.0 |
| Starch | 50.0 |
| Total | 400.0 |

Uniformly blend the selected active ingredient with lactose and starch and encapsulate the blend.

| (2) Injectable | Per cc. |
|---|---|
| Active ingredient, as salt | 100 mg. |
| Preservative, e.g., chlorobutanol | % w./v. - 0.5 |
| q.s. Water to 1.0 ml. | |

Prepare solution, clarify by filtration, fill into vials, seal and autoclave.

What is claimed is:

1. A compound selected from 5-(2-aminoethyl)-2,3-dioxopiperazines having the formula:

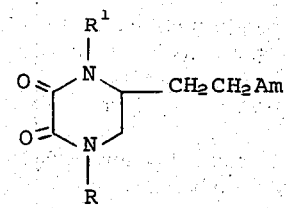

wherein;
R is selected from the group consisting of lower-alkyl and cyclohexyl,
$R^1$ is phenyl,
Am is selected from the group consisting of methylamino, isopropylamino and dimethylamino and pharmaceutically acceptable acid addition salts thereof.

2. A compound of claim 1 which is 2,3-dioxo-5-(2-dimethylaminoethyl)-1-isopropyl-4-phenylpiperazine.

3. A compound of claim 1 which is 5-(2-dimethylaminoethyl)-2,3-dioxo-1-methyl-4-phenylpiperazine.

4. A compound of claim 1 which is 5-(2-dimethylaminoethyl)-2,3-dioxo-1-ethyl-4-phenylpiperazine.

5. A compound of claim 1 which is 1-cyclohexyl-2,3-dioxo-5-(2-dimethylaminoethyl)-4-phenylpiperazine.

* * * * *